United States Patent Office

3,250,628
Patented May 10, 1966

3,250,628
MARGARINE MANUFACTURE
Morris Dean Wilding, La Grange, Ill., assignor to Swift & Company, Chicago, Ill., a corporation of Illinois
No Drawing. Filed June 14, 1963, Ser. No. 287,772
7 Claims. (Cl. 99—122)

This invention relates to the preparation of margarine, and more specifically to the preparation of a non-curdling margarine product.

Margarine, as it is generally prepared commercially, constitutes an emulsion produced from the mixture of an aqueous phase and an oil phase together with a small amount of other ingredients. The present methods for manufacturing margarine call for the use of skimmed milk, which has had a large percentage of the lipo proteins removed, as the aqueous phase of the margarine emulsion. When exposed to temperatures slightly above the melting point, the margarine, which has been prepared according to present commercial formulae or specifications, stratifies into aqueous and oil layers. In the aqueous layer, a large curd formation develops which is unsightly and unappetizing to the consumer or user. This curd formation is due to the aggregation of the proteins from the skimmed milk used. Butter, the chief competitor of margarine, does not show this curd formation when melted due to the fact that the proteins in butter are uniformly dispersed throughout the aqueous phase. It is thus desirable, in order to make a more competitive margarine product, that the large curd formation which results when margarine is warmed to the melting point be eliminated.

Various procedures in the past have been attempted in an effort to prevent this large curd formation, many of which have been directed to the treatment of the skimmed milk used. Among the procedures included in previous attempts are: the superheating of the milk, the addition of sodium nitrate or sodium phosphate to the milk, the treatment of the milk with bacteria cultures or with enzymes, and the homogenization of the milk. All of these attempted procedures have for one reason or another been unsuccessful in eliminating the large curd formation while still producing a commercially acceptable margarine product. Superheating of the milk causes the margarine to have a dark color and a burnt flavor; a hard compact curd is produced when the milk has been treated with sodium nitrate, sodium phosphate, or bacterial cultures; the enzyme treatment alone results in heavy coaggulation, and homogenization alone of the milk is almost completely ineffective in diminishing the curd formation with little distinction being shown between the melted margarine which has been prepared with homogenized milk and melted margarine which has been prepared with untreated milk. The problem of large curd formation when margarine is melted has thus remained a problem until this time of the instant invention.

It has now been found that a margarine can be produced which, when melted to the point at which the oil and aqueous layers separate, shows no undesirable curdling upon exposure to temperatures above melting. This production is accomplished by the novel procedure of employing a milk which has been treated with a proteolytic enzyme and subsequently homogenized.

Accordingly, it is a principal object of this invention to provide an improved process for the preparation of margarine.

Another object of this invention is to provide a process for preparing a margarine product which shows no undesirable curdling or aggregation of proteinaceous materials in the aqueous phase when subjected to temperatures above melting.

Still another object of this invention is to prevent the large aggregation of skimmed milk proteins upon melting of margarine by an enzymatic treatment of the proteins followed by a mechanical breakdown of the enzymatically treated particles.

Yet another object of the invention is to provide a margarine product, the proteinaceous particles of which demonstrate a reduced tendency to agglomerate upon melting of the margarine.

Other objects not set forth above will become readily apparent to those skilled in the art from the following detailed description of my invention.

The present invention generally relates to a process for the preparation of a margarine in which the soft curd pasteurized skimmed milk, which has been treated with a proteolytic enzyme and subsequently homogenized, is employed as the aqueous phase of the margarine composition. The soft curd milk is prepared by first pasteurizing the milk, then treating it with a proteolytic enzyme. After the enzyme treatment, the milk is homogenized to produce colloidal sized particles which do not aggregate when the margarine in which they are incorporated is melted.

The serum or milk used is usually whole skim milk or reconstituted skim milk solids. Although more expensive, either whole milk or buttermilk may also be used. The serum is often cultured with bacteria strains which produce diacetyl or other buttermilk-like flavors to impart to the margarine product a butter-like flavor.

The oil phase of the instant margarine is prepared from vegetable oils such as soybean, cottonseed, cocoanut, peanut, corn, safflower, etc. Satisfactory margarine products can also be made from a blend of these oils which have been hydrogenated to meet the requirements of the particular margarine desired. The entire margarine product which is produced may vary somewhat in its composition but generally consists of approximately 70% to 90% by weight margarine oils, 5% to 30% milk or serum proteins, and about 0 to 4% common salt. Also other ingredients may be added such as lecithin as an emulsifier, coloring agents, and flavor additives to give the desired physical, flavor, and color properties to the final margarine product.

We have found that proteolytic enzymes or proteases in general are suitable for use in the present invention, including proteolytic enzymes of animal, plant, fungal, and bacterial origin. The enzymes should, of course, be nontoxic per se or purified to remove inedible components. Commercial enzyme prepartions are normally used. Some of the specific enzymes suitable for use are the enzymes of animal origin, trypsin, pepsin, cathepsin, pancreatin, and rennin; the enzymes of plant origin, bromelin, ficin, and papain; typical molds from which proteases are derived include *Aspergillus oryzae, Aspergillus niger, Aspergillus alliaceus,* and *Aspergillus wentii.* Other suitable enzymes are those derived from overall culture of bacterial organisms such as *Bacillus mesenteroides, Bacillus subtilus,* and Clostrium species. Of the various proteolytic enzymes that may be employed, papain, chymopapain, bromelin, ficin, pepsin, and trypsin, are preferred and particularly rennin.

The enzymes may be used within the temperature and pH ranges at which they demonstrate activity, but preferably are introduced into the milk under the optimum conditions for the specific enzyme employed. Constant stirring is conducted throughout the reaction period to prevent the formation of a large aggregate of proteins. The enzymes operate over a wide range of temperatures, concentrations, and pH ranges. The pH range of the enzymes listed above for example covers from about 1.5 for pepsin to about 8.5 for trypsin. The temperature may range from about 20° C. for ficin to about 90° C. for papain. The enzyme activity is demonstrated from concentrations of approximately 5 parts per million to 5% by weight of the milk or more, depending upon the conditions. Concentrations in excess of 5% can be used but are not practical.

The time required to produce a specific change in the milk proteins treated is a function of temperatures, pH, enzyme concentration, and other activating conditions. The enzyme treatment of the milk proteins is continued until clotting action occurs. The subsequent homogenization of the protein aggregates which form during the enzyme treatment produces a colloidal suspension of the proteins and thus prevents further curdling of the proteinaceous particles. The homogenization step may be conducted generally in any manner by which the protein particles are subjected to high speed stirring and shearing action which will cause reduction of the particles to colloid size. We have found that a regular dairy homogenizer is particularly useful and may be employed over a varied pressure range with pressures of between 500 p.s.i. and 3,000 p.s.i. having been found highly satisfactory. When the milk so treated is used in the manufacture of margarine, the margarine shows no large and unsightly aggregation of proteins in the aqueous phase upon heating to the point of normal oil stratification. The present invention can be performed either on the serum or milk prior to mixing it with the oil phase or after the milk and oil have been mixed.

The following examples of the present invention are given by way of illustration only and are not to be construed as limitative thereof.

Example I

Into a reaction vessel were placed 765 grams of skimmed milk (0.2% acidity) and the enzyme rennin in an amount of 3 ounces per thousand pounds of milk. The reaction was continued with constant agitation for 30 minutes at 32° C. after which time a fine curd had formed. The enzyme treated milk was then pasteurized for 30 minutes at 71° C. with stirring. The pasteurized milk was homogenized to a fine colloidal suspension and then mixed with 3,610 grams of refined margarine oil (containing coloring and other oil soluble margarine ingredients) and votated into margarine. The resultant margarine products upon melting showed no agglomeration of proteinaceous particles.

Example II

Thirty-six hundred and ten grams of refined margarine oil were mixed with 765 grams of skimmed milk. This mixture was treated with rennin in a manner similar to the process described in Example I above. The oil-milk mixture was then passed through the homogenizer to produce a colloidal size emulsion which was votated into margarine. Again it was observed that the margarine upon melting showed no tendency to form agglomerations of proteins.

Example III

The same procedure was followed as in Example I above but with papain being used as the proteolytic enzyme and at a temperature of 80° C. Equally effective results were obtained.

Example IV

Again the procedure of Example I was employed but with pepsin being substituted for rennin as the proteolytic enzyme and with a temperature of 38° C. being used. The proteinaceous particles of the resulting margarine product showed no tendency to agglomerate upon melting of the margarine.

Example V

The enzyme ficin in an amount of 3.5 ounces per thousand pounds of milk was introduced into 1,000 grams of milk at a temperature of 65° C. and the pH was adjusted to 6.5. The reaction was continued for 20 minutes with constant stirring being conducted throughout this period. A fine curd developed during the reaction. The enzymatically treated milk was homogenized and then mixed with margarine oil containing coloring and other oil soluble ingredients and votated into margarine. No curdling was observed upon melting of the margarine prepared.

Example VI

The same procedure as for Example V was employed but with the enzyme bromelin being substituted for ficin and with a temperature of 60° C., pH of 6.0, and enzyme concentration of 2.5 ounces per thousand pounds of milk being used. Equally satisfactory results were obtained.

Obviously, many modifications and variations of the invention as herein set forth may be made without departing from the spirit and scope thereof, and therefore only such limitations should be imposed as are indicated in the appended claims.

I claim:
1. In the method for preparing a noncurdling margarine product, the steps which comprise: forming a mixture of the oil and milk phases of said margarine; reacting said mixture with a proteolytic enyme for a time sufficient to produce clotting of the proteins of said milk phase; and subsequently homogenizing said mixture.

2. The method of preparing a margarine product, the proteinaceous particles of which show a reduced tendency to agglomerate upon melting which comprises: forming a mixture of the oleaginous and milk phases of said margarine product, reacting said mixture with at least 5 p.p.m., based on the weight of said milk phase, of a proteolytic enyme for a time sufficient to agglomerate the proteins of said milk phase; and homogenizing said mixture after the enzymatic treatment thereof.

3. In the method of preparing a non-curdling margarine product the steps comprising: forming a mixture of the oil and milk phases of said margarine product; reacting said mixture with a proteolytic enzyme at a temperature between 20° to 90° C. within the pH range from about 1.5 to about 8.5 for a period of time sufficient to cause agglomeration of the proteins of said milk phase; and homogenizing said mixture to form a fine colloidal suspension thereof.

4. The method of preparing a margarine product having an oil and milk phase, the proteinaceous particles of which show a reduced tendency to agglomerate upon melting comprising: forming a mixture of the oil and milk phases of said margarine product; reacting said mixture with a proteolytic enyme of at least 5 p.p.m., by weight of said milk phase, said reaction being within a pH range from about 1.5 to about 8.5 and temperature range between 20° to 90° C. for a period of time sufficient to produce agglomeration of the proteins of said milk phase; and homogenizing said mixture to produce a colloidal suspension thereof.

5. The method of preventing the agglomeration of proteins in a melted margarine product which comprises: reacting the milk phase of said margarine product with a proteolytic enzyme at least 5 p.p.m. by weight, and at the optimum conditions of pH and temperature for said proteolytic enzyme for a period of time sufficient to produce agglomeration of the milk proteins; and forming a mixture of the milk and oil phases of said margarine product and homogenizing said mixture to form a stable colloidal suspension thereof.

6. The method of preventing agglomeration of proteins in a melted margarine product which comprises: reacting the milk phase of said margarine with a proteolytic enzyme at least 5 p.p.m. by weight, at a temperature from about 20° to about 90° C. at a pH of from about 1.5 to about 8.5 for a period of time sufficient to produce clotting of the proteins of said milk phase; and forming a mixture of the milk and oil phases of said margarine product and homogenizing said mixture to form a stable colloidal suspension thereof.

7. In the method of preparing a non-curdling margarine product the steps comprising: forming a mixture of the oil and milk phases of said margarine; reacting said mixture with about 5 p.p.m. by weight of a proteolytic enzyme for a time sufficient to cause clotting of the milk proteins, at a temperature between 20–90° C. and a pH range of from about 1.5 to about 8.5; and thereafter homogenizing said mixture to form a fine colloidal suspension thereof.

References Cited by the Examiner

UNITED STATES PATENTS

| | | | |
|---|---|---|---|
| 1,477,153 | 12/1923 | Rogers | 99—59 |
| 1,815,727 | 7/1931 | Reynolds et al. | 99—59 X |
| 2,009,135 | 7/1935 | Grelck | 99—59 X |
| 2,343,713 | 3/1944 | Spur | 99—54 |
| 2,376,693 | 5/1945 | Helmer et al. | 99—54 |

OTHER REFERENCES

Schwitzer, "Margarine and Other Food Fats," Interscience Publishers, Inc., N.Y., 1956, pp. 235 and 236.

A. LOUIS MONACELL, *Primary Examiner*.